March 24, 1953  J. DOLZA ET AL  2,632,340
V-SIX ENGINE

Filed April 7, 1949  3 Sheets-Sheet 1

Inventors
John Dolza,
Gilbert Burrell,
Everett B. Sherrick &
Robert Schilling
By
Spencer, Willits, Helwig & Baillie
Attorneys

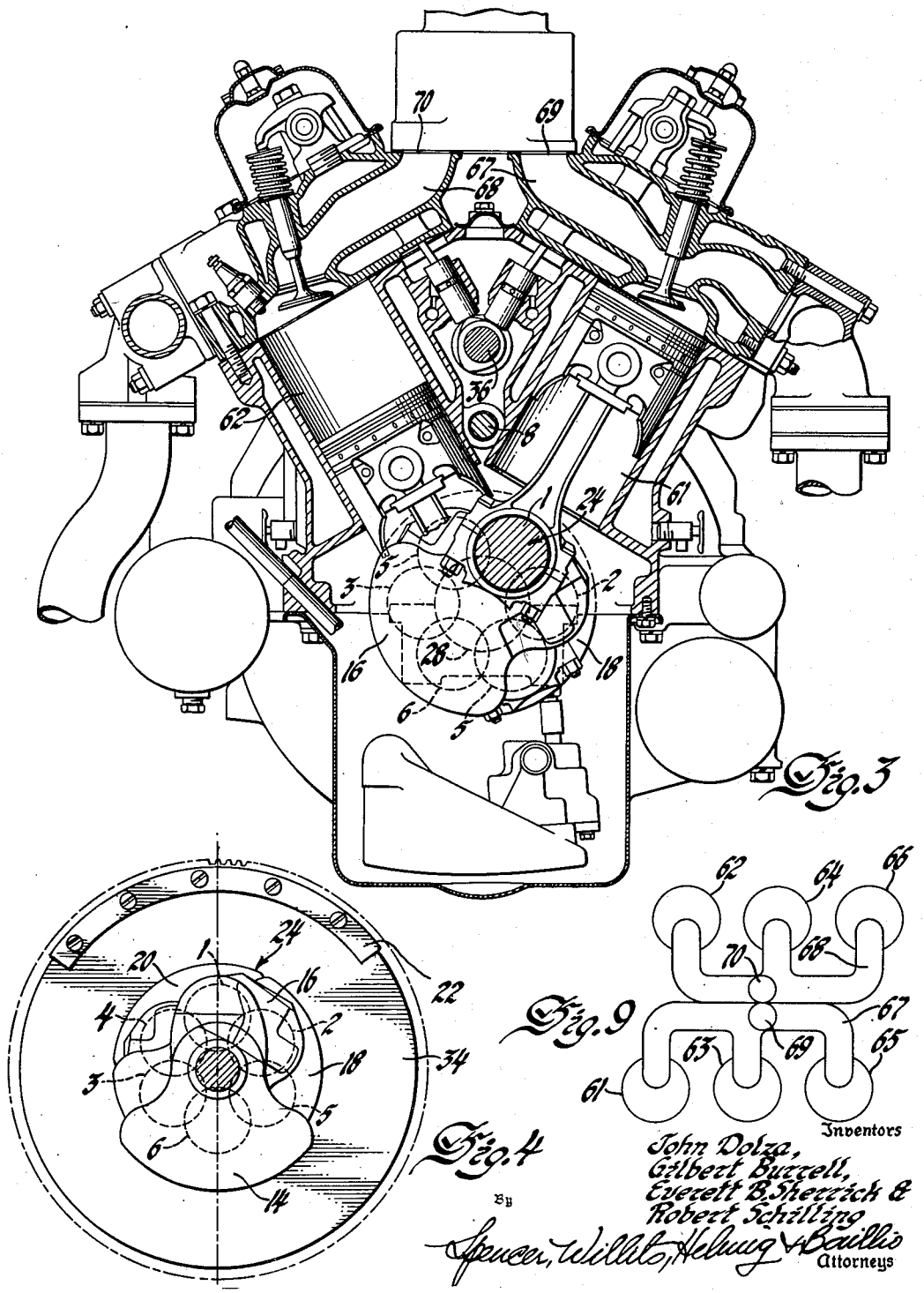

March 24, 1953     J. DOLZA ET AL     2,632,340
V-SIX ENGINE
Filed April 7, 1949     3 Sheets-Sheet 3
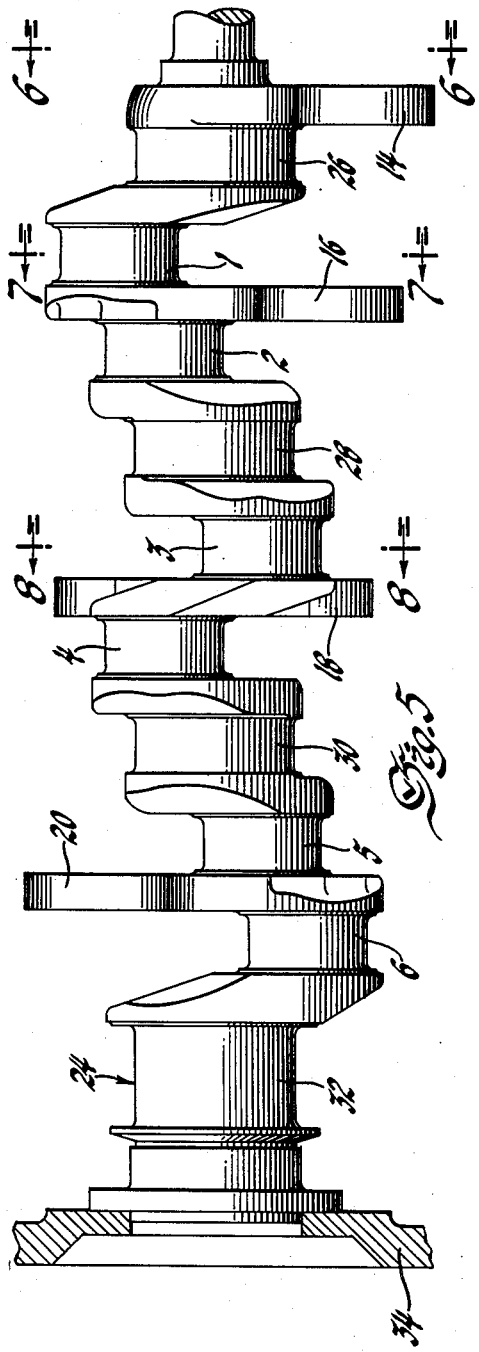
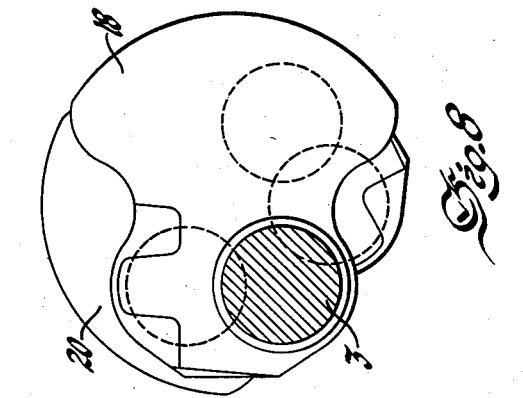
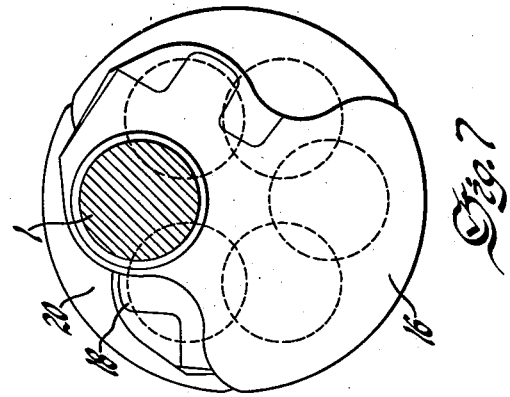
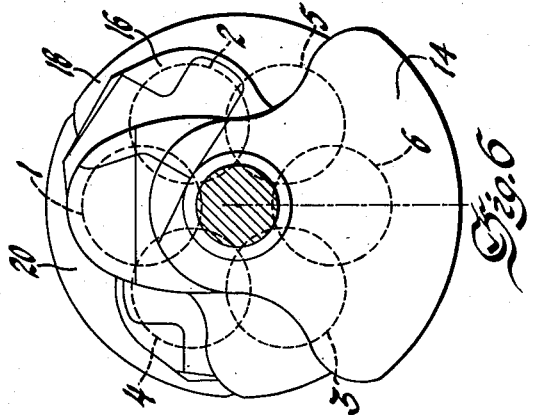
Inventors
John Dolza,
Gilbert Burrell,
Everett B. Sherrick &
Robert Schelling
By Spencer, Willits, Helwig & Baillio
Attorneys Patented Mar. 24, 1953

2,632,340

UNITED STATES PATENT OFFICE 2,632,340

V-6 ENGINE

John Dolza, Fenton, Gilbert Burrell, Lansing, Everett B. Sherrick, Pontiac, and Robert Schilling, Birmingham, Mich., assignors to General Motors Corporation, Detroit, Mich., a corporation of Delaware Application April 7, 1949, Serial No. 86,048

7 Claims. (Cl. 74—603)

The present invention relates to internal combustion engines, and more particularly relates to the crankpin arrangement and balancing means for a 60° V-6 engine.

Modern automotive internal combustion engines are required to operate at high speed with a minimum of vibration. This requirement necessitates accurate and complete balancing of the inertia forces and couples set up by rotating and reciprocating masses within the engine.

V-6 engines are rigid and compact and are therefore desirable as automotive power plants. The lack of a suitable crankshaft design and balancing means for these engines has delayed their adoption by the automotive industry. It is well-known that if the forces and couples of an engine are not balanced, excessive vibration will result. This vibration greatly increases the wear on engine parts, and passenger discomfort and reduces the life of the engine. For these reasons it is necessary to reduce engine unbalance to a minimum.

Engines may be out of balance, with resulting vibration and excessive wear, due to either unbalanced forces or unbalanced couples. The unbalance forces may be "primary" or those operating at engine speed or may be higher order forces which are classified as a "secondary," "tertiary," etc. corresponding to the harmonic of engine speed at which they are effective. The term "unbalance couple" as here applied, is the product of the force times the distance the force acts from a preselected datum line. These couples may be either so-called "shaking" couples which are manifest by forces acting in a single plane lying in the longitudinal axis of the engine or they may be rotating couples which change their direction of application with respect to the line of center of the engine either at engine speed or at some harmonic thereof. The design of the present engine eliminates all shaking couples. The unbalance, due to rotating forces resulting in rotating couples of higher order than secondary, are negligible in the present engine. The primary unbalance forces and rotating couples are counterbalanced by the use of weights located on the engine crankshaft and fly-wheel. The engine of this specific design also has a couple applied transverse to the axis of the engine and rotating at twice crankshaft speed or a secondary couple which should be counterbalanced.

It is therefore an object of the present invention to produce a six cylinder V-type engine having a very low magnitude over-all unbalance.

It is also an object of the present invention to produce a 60° V-6 engine with proper counterbalancing means to neutralize primary and secondary forces and couples.

It is another object of the present invention to provide an engine having high rigidity.

It is another object of the present invention to produce a V-6 engine in which the engine cylinders fire in sequence either from front to back or from back to front as desired.

It is a further object of the present invention to provide a crankshaft of high torsional rigidity.

It is a still further object of the present invention to provide a four-cycle V-6 firing arrangement which promotes good intake manifold characteristics.

Other objects of the present invention will become apparent upon inspection of the drawings and reading of the specification as will be particularly pointed out in the claims.

Referring now to the figures in the drawings,

Figure 3 is a partial transverse sectional view taken along the line 3—3 of Figure 2.

Figure 4 is a face view of the engine crankshaft and fly-wheel looking from right to left in Fig. 2, and showing the counterbalancing means associated with those parts.

Fig. 5 is an enlarged view of the crankshaft with its counterweights as used in the present invention.

Figure 6 is a partial sectional view taken along the line 6—6 of Figure 5.

Figure 7 is a partial sectional view taken along the line 7—7 of Figure 5.

Figure 8 is a partial sectional view taken along the line 8—8 of Figure 5.

Figure 9 is a schematic diagram of the intake manifold arrangement.

Figures 1, 2:
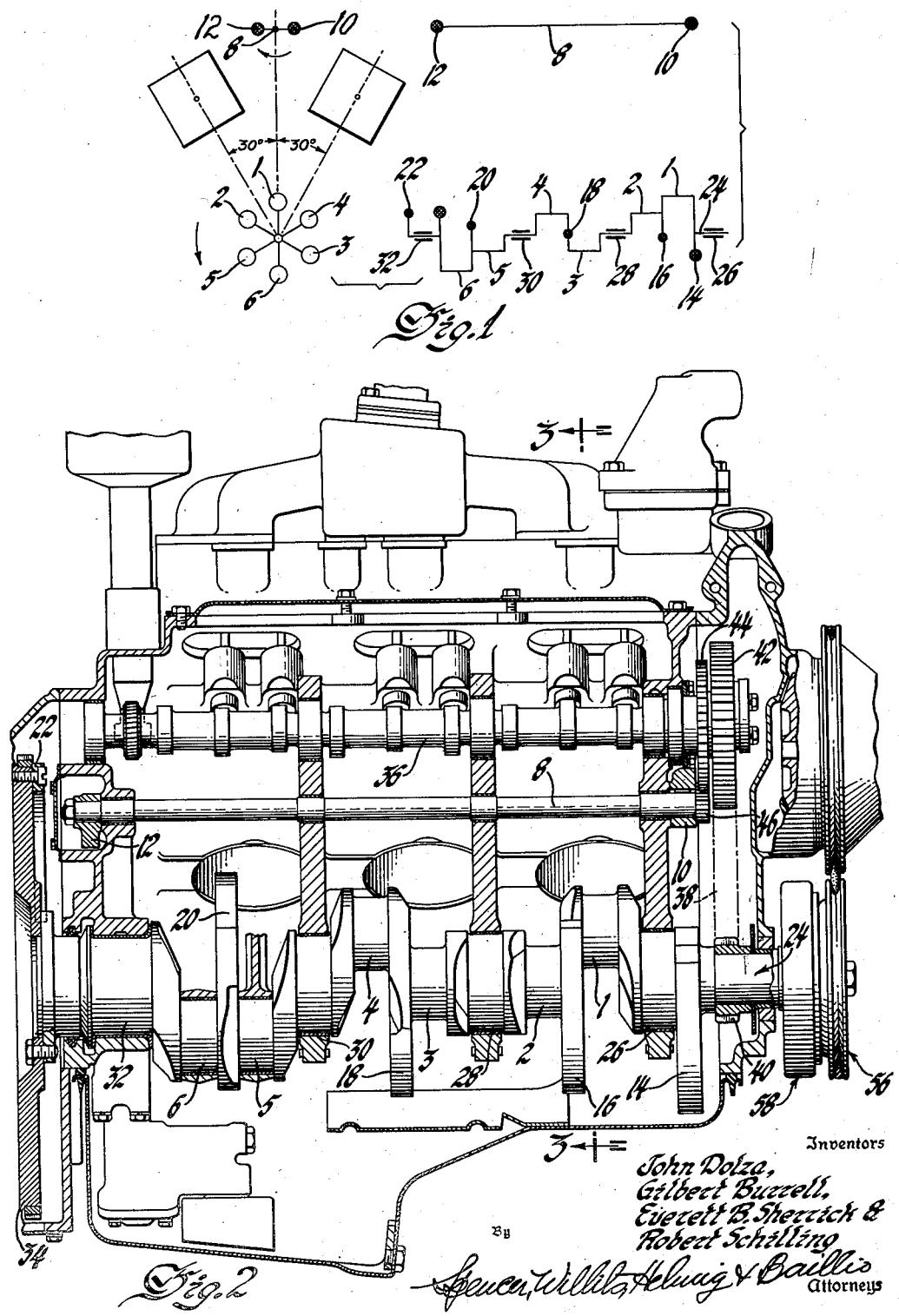
Figure 1 is a schematic view of the counterbalancing means which is part of the present invention.
Figure 2 is a partial sectional view taken along the center line of the present engine.

Referring now more particularly to Figure 1, the longitudinal location and radial spacing of crankpins 1, 2, 3, 4, 5 and 6 is illustrated. This crankshaft has located thereon counterweights 14, 16, 18 and 20. Counterweight 22 is attached to the fly-wheel. The counterweight 16 is of such mass and so located as to substantially balance the inertia forces set up by crankpins 1 and 2 and the rotating masses attached thereto. Counterweight 18 similarly balances the rotating masses associated with crankpins 3 and 4. The same is true with regard to the counterweight 20 and the masses at crankpins 5 and 6. As will be noted later in the specification, the crankpins 1 and 2 are displaced 60° from each other and the counterweight 16 is angularly located 150° from each of said crankpins. The crankpins 3 and 4 are displaced 120° respectively from the crankpins 1 and 2 and are each 150° from the counterweight 18. The crankpins 5 and 6 are located 120° respectively from the crankpins 3 and 4 and are each 150° from counterweight 20. It may thus be seen that the crankpins 1, 3 and 5 are displaced 120° from each other as are the crankpins 2, 4 and 6 and also the counterweights 16, 18 and 20. This method of balancing helps neutralize the unbalance forces to reduce main bearing load but leaves an unbalanced primary couple which must be removed by the counterweights 14 and 22. With the proper placing of these counterweights the engine is in primary balance but has a slight amount of secondary unbalance which manifests itself in a rotating couple. This couple rotates in a direction opposite to and at twice the angular velocity of the crankshaft. In order to counterbalance this secondary rotating couple, it has been found desirable to use a balance shaft 8 with weights 10 and 12 attached thereto to produce a counterbalancing couple rotating at twice crankshaft speed and phased 180° from the unbalance couple mentioned above.

Referring now to Figures 2 and 3, the crankshaft, balance shaft and other parts of the engine are shown in greater detail. The crankshaft 24 here shown has four main bearings 26, 28, 30 and 32 respectively and has crankpin bearings 1, 2, 3, 4, 5 and 6. These crankpin bearings are arranged in 60° displaced pairs each pair having an oppositely disposed counterweight. Crankpins 1 and 2 are located between main bearings 26 and 28 and have a counterweight 16 whose center of mass is located 150° from each of crankpins 1 and 2. Crankpin bearings 3 and 4 are located between main bearings 28 and 30 and have a counterweight 18 longitudinally disposed between said crankpins and radially disposed 150° from each of said crankpins. Crankpin bearings 5 and 6 are located between main bearings 30 and 32 and have counterweight 20 longitudinally disposed 150° from each of said crankpins. These counterweights 16, 18 and 20 are so selected as will be later described to minimize main bearing loads and crankshaft flexure. It will be noted by inspection of Figures 1, 2 and 3 that crankpin bearings 3 and 4 are located 120° respectively from crankpins 1 and 2 and that crankpin 5 is located 120° from both crankpins 1 and 3 and that crankpin 6 is located 120° from both crankpins 2 and 4. It will thus be seen that this crankshaft consists of three pairs of 60° displaced crankpins each pair displaced 120° from the other two pairs. This crankpin and counterweight location gives an arrangement in which the forces, both primary and secondary, are inherently in balance. The same is not true however with regard to primary and secondary rotating couples. This crankshaft has a primary rotating couple which is neutralized by a couple created by the 180° displaced weights 14 and 22 as will be described later. The counterweight 22 of course may be located on the crankshaft 24 instead of on the fly-wheel 34 as here illustrated. The counterweight 14 likewise may be incorporated in the drive pulley 56 or the torsional vibration damper 58 without departing from the scope of the present invention. By the proper selection and placement of these weights, as will be described later, the engine is placed in primary balance with regard to both primary forces and primary couples. This engine also has a secondary unbalance couple which is neutralized by a 180° displaced rotating couple of equal magnitude and frequency set up by balance shaft 8 with its attached unbalance weights 10 and 12 which weights are displaced 180° from each other. This engine has a cam shaft 36 located in the V of the engine and driven at one-half crankshaft speed by drive chain 38 and gears 40 and 42. The shaft 36 has rigidly attached thereto a second gear 44 which gear is meshed with the gear 46 rigidly attached to the balance shaft 8. The pitch diameter of the gear 44 is four times the pitch diameter of the gear 46 thus causing the shaft 8 to rotate at four times the speed of cam shaft 36 or twice the speed of crankshaft 24. By the proper proportioning of the weights 10 and 12 and placing them in the proper phase relationship with the crankshaft, the inherent secondary unbalance couple of this engine may be neutralized by rotating this balance shaft in a direction opposite that of the crankshaft and at twice crankshaft speed. This method of balancing the secondary unbalance couple will be described later in more detail.

Referring now to Figure 4, the fly-wheel 34 is shown in greater detail and the angular location of the counterweight 22 is specifically illustrated. The center of mass of this counterweight 22 has the same angular displacement as the center line of crankpin 1. The center of mass of the weight 14 is located in the same plane as the center of mass of weight 22 but 180° displaced therefrom, and from the center line of crankpin 1.

Referring now to Figures 5, 6, 7 and 8, the crankshaft used in the present engine is shown in greater detail. As described above the crankpins 1 and 2 are located between main bearings 26 and 28 and have a counterweight 16 longitudinally located therebetween. The crankpins 3 and 4 are located between bearings 28 and 30 and have a counterweight 18 longitudinally located between them. The crankpins 5 and 6 are located between the main bearings 30 and 32 and have a counterweight 20 located between them.

It will be noted that the crankpins located on opposite sides of the intermediate main bearings are indexed 180 degrees from each other. This location results in the rotary inertia forces set up by the crankpins imposing a minimum resultant load on these intermediate main bearings. Each pair of crankpin bearings between each pair of main bearings is indexed but 60 degrees from each other thus permitting the use of a single counterweight of minimum mass to counteract the inertia forces set up by the crankpin masses.

Referring now to Figure 9 the cylinders of the engine are numbered 61, 62, 63, 64, 65 and 66 reading from the front to the rear of the engine.

The cylinders 61, 63 and 65, in accordance with the firing arrangement previously described, have intake strokes 240 degrees displaced from each other, as have cylinders 62, 64 and 66. We propose to utilize a dual type carburetor having twin fuel passages 69 and 70. By so arranging the firing arrangement and manifolding, a volumetric efficiency is obtained much superior to that possible with six cylinder engine firing arrangements in the prior art.

*Method of balancing*

As is well-known in the crankshaft balancing art, an internal combustion engine piston connecting rod crankpin assembly sets up rotating and reciprocating forces which must be counteracted to provide smooth operation. This rotating force is set up by the combined masses of the crankpin, crankpin cheeks, and the lower end of the connecting rod assembly. To determine the magnitude of the rotating and reciprocating masses of the connecting rod, it has been found convenient to suspend the connecting rod at its crankpin and at its wrist pin and consider the mass at the crankpin as a rotating mass and the mass at the wrist pin as a reciprocating mass. The rotating forces set up by the connecting rod pin and lower end of the connecting rod assembly may be easily calculated and counterweighted.

The forces set up in the plane of each bank of cylinders by the reciprocating masses have an algebraic sum of zero. The sum of the primary couples set up by these forces however is not zero but forms a rocking couple in the plane of that bank.

We have found however that if the following relationship between each pair of crankpins and the engine block V angle is adhered to, the primary rocking couples in the two banks will combine vectorially to form a rotating couple of constant magnitude:

$$\frac{\text{crankpin angle}}{2} = 90 \text{ degrees} - \text{V angle}$$

In a 60 degree V-6 engine with a crankpin arrangement as here illustrated, the unbalanced primary couples in the two cylinder banks add up to a rotating couple of constant magnitude. This rotating couple is in phase with the rotating couple created by the rotating primary unbalance forces of the crankshaft and may be counterweighted together with this last mentioned unbalanced couple by a single pair of counterweights 14 and 22.

There are couples whose frequencies are harmonics of the primary crankshaft frequency. These are caused by the motion of the piston not being a simple harmonic motion. The couples at harmonics higher than the second are of such small magnitude as to be negligible.

We have found that by using the block angle, crank angle relationship noted above, that if we choose a block angle satisfying the following equation, the secondary rocking couples in the two banks of cylinders combine to form rotating couples of constant magnitude.

$$\text{cosine block angle times cosine } \frac{\text{block angle}}{2} =$$
$$\text{sine block angle times sine } \frac{\text{block angle}}{2}$$

This gives us a block angle of 60 degrees which also permits equal firing intervals. The secondary rotating couple thus produced is neutralized in the present invention by balance shaft 8.

In order to determine the mass of the intermediate counterweights 16, 18 and 20 to give minimum main bearing loading, we attach a ring weight $Wr$ to each crankpin whose magnitude is given by the equation:

$$Wr = Wc + \frac{Wi}{2} + \frac{Wi}{8} \frac{(R)^2}{(L)^2}$$

Where:

$Wc$ = rotating weight per crankpin (lower end of connecting rod)
$Wi$ = reciprocating weight per cylinder (upper end of connecting rod and piston assembly)
$R$ = crank radius
$L$ = connecting rod length A polar diagram is then made by vectorially adding the components of the gas, inertia and centrifugal forces of two cylinders in one pair with the resulting force assumed acting at the center line of the cheek or counterweight. Proper counterweights 16, 18 and 20 are then selected (these counterweights are of equal magnitude) to give a minimum peak load in the polar diagram. After thus selecting these intermediate counterweights, the end counterweights 14 and 22 may be determined by calculating the static moments of the crankshaft for these ring weights and the unbalance of the crankpins, cheeks and counterweights 16, 18 and 20. The solution of these counterweights is simplified by considering components separately in a horizontal and in a vertical plane.

The equation for the secondary couple in the present engine is:

Vertical component $$CV = 1.5d \frac{WiR^2w^2}{gL} \sin(2\theta + 90 \text{ degrees})$$

Horizontal component $$CH = 1.5d \frac{WiR^2w^2}{gL} \cos(2\theta + 90 \text{ degrees})$$

Where:

$d$ = main bearing spacing
$w$ = angular velocity of crankshaft
$g$ = acceleration of gravity
$\theta$ = crank angle of number 1 crankpin from vertical position The above equations represent a constant rotating couple which may be conveniently balanced by a dynamic balance shaft 8 with counterweights 10 and 12 indexed at 180 degrees to induce an opposite and equal rotating couple. The dynamic balance shaft counterweight $Wr$ required to balance the rotating secondary couple is given by the equation:

$$Wr = \frac{1.5dWiR^2}{4DL}$$

Where:

$Wr$ = static unbalance moment of one secondary counterweight lbs. ins. around the balance shaft axis
$D$ = longitudinal spacing of secondary counterweights on the dynamic balance shaft The phase and direction of rotation of this dynamic balance shaft 8 is shown in Figure 1.

It is to be understood also that although the invention has been described with specific ref-

We claim:

1. In a six-cylinder V-type four-cycle internal combustion engine having to banks of three cylinders each with an angle of 60° between the banks, a crankshaft having six connecting rod bearings equiangularly displaced in pairs of crankpins spaced from each other 60° and from the adjacent pair 120°, a journal provided in front of the first pair of crankpins, a second journal provided between said first and second pairs of crankpins, a third journal provided between said second and third pairs of crankpins and a fourth journal provided after the third pair of crankpins, the crankpins disposed adjacent the opposite ends of said second and third journals being disposed 180° from each other, three counterweights each located diametrically opposite of each of the said pairs of crankpins and of sufficient magnitude to minimize the flexure of said crankshaft, a pair of counterweights attached to said crankshaft and so angularly displaced and of such magnitude as to produce a couple of sufficient magnitude to counterbalance the otherwise unbalanced rotating couple produced on said crankshaft by masses attached thereto, and a second shaft positively driven by said crankshaft at twice crankshaft speed, said second shaft having attached thereto two 180° displaced unbalance weights of such magnitude and longitudinal displacement as to produce a couple rotating at twice crankshaft speed and of such magnitude as to counterbalance the rotating couple otherwise present in said engine.

2. In a six-cylinder V-type four-cycle internal combustion engine having two 60° displaced banks of three cylinders each, a crankshaft having six crankpin bearings equiangularly displaced in pairs of crankpins spaced from each other 60° and from the adjacent pair 120°, a journal provided in front of the first pair of crankpins, a second journal provided between said first and second pairs of crankpins, a third journal provided between said second and third pairs of crankpins and a fourth journal provided after the third pair of crankpins, the crankpins disposed adjacent the opposite ends of said second and third journals being disposed 180° from each other, three counterweights each located diametrically opposite to each of the said pairs of crankpins and of sufficient magnitude to minimize the flexure of said crankshaft, and a pair of counterweights attached to said crankshaft and so angularly displaced and of such magnitude as to produce a couple of sufficient magnitude to counterbalance the otherwise unbalanced rotating couple produced on said crankshaft by masses attached thereto.

3. In an engine of the class described, a crank shaft comprising six crankpins spaced 60° from each other and arranged in three pairs, each crankpin of each of said pairs being spaced 120° from one of the crankpins of each of the other pairs, a journal disposed between the first and second pairs of crankpins, a second journal disposed between the second and third pairs of crankpins, and the crankpins adjacent the opposite ends of each of said journals being disposed substantially 180° from each other.

4. In an engine of the class described, a crank shaft comprising six crankpins spaced 60° from each other and arranged in three pairs, each crankpin of each of said pairs being spaced 120° from one of the crankpins of each of the other pairs, a journal provided in front of the first pair of crankpins, a second journal provided between said first and second pairs of crankpins, a third journal provided between said second and third pairs of crankpins and a fourth journal provided after the third pair of crankpins, the crankpins disposed adjacent the opposite ends of said second and third journals being disposed 180° from each other, and weight means associated with each of said pairs of crankpins for counterbalancing the forces created by said crankpins during operation of the crankshaft.

5. In an engine of the class described, a crank shaft comprising six crankpins spaced 60° from each other and arranged in three pairs, each crankpin of each of said pairs being spaced 120° from one of the crankpins of each of the other pairs, a journal provided in front of the first pair of crankpins, a second journal provided between said first and second pairs of crankpins, a third journal provided between said second and third pairs of crankpins and a fourth journal provided after the third pair of crankpins, the crankpins disposed adjacent the opposite ends of said second and third journals being disposed 180° from each other, and three counterweights, one of said counterweights being provided opposite each of said pairs of crankpins and the center of mass thereof being disposed at substantially 150° from each of the crankpins of the associated pair.

6. In an engine of the class described, a crank shaft comprising six crankpins spaced 60° from each other and arranged in three pairs, each crankpin of each of said pairs being spaced 120° from one of the crankpins of each of the other pairs, a journal provided in front of the first pair of crankpins, a second journal provided between said first and second pairs of crankpins, a third journal provided between said second and third pairs of crankpins and a fourth journal provided after the third pair of crankpins, the crankpins disposed adjacent the opposite ends of said second and third journals being disposed 180° from each other, weight means associated with each of said pairs of crankpins for counterbalancing the forces created by said crankpins during operation of the crankshaft, and a counterweight provided near each end of said crankshaft for counterbalancing an unbalanced rotating couple produced on said crankshaft, said last mentioned counterweights being disposed substantially 180° apart.

7. In an engine of the class described, a crank shaft comprising six crankpins spaced 60° from each other and arranged in three pairs, each crankpin of each of said pairs being spaced 120° from one to the crankpins of each of the other pairs, a journal provided in front of the first pair of crankpins, a second journal provided between said first and second pairs of crankpins, a third journal provided between said second and third pairs of crankpins and a fourth journal provided after the third pair of crankpins, the crankpins disposed adjacent the opposite ends of said second and third journals being disposed 180° from each other, weight means associated with each of said pairs of crankpins for counterbalancing the forces created by said crankpins during operation of the crankshaft, a counterweight provided near each end of said crankshaft for counterbalancing an unbalanced rotating couple produced on said crankshaft, said last mentioned counterweights being disposed substantially 180° apart, a second shaft positively driven by said crankshaft at twice the speed of the latter, and two 180° displaced unbalanced weights attached to said second shaft for further counterbalancing a rotating couple otherwise present in said engine.

JOHN DOLZA.
GILBERT BURRELL.
EVERETT B. SHERRICK.
ROBERT SCHILLING.

REFERENCES CITED

The following references are of record in the file of this patent:

UNITED STATES PATENTS

| Number | Name | Date |
|---|---|---|
| Re. 14,292 | Fekete | Apr. 24, 1917 |
| Re. 15,019 | Landgraf | Jan. 4, 1921 |
| 1,138,648 | Ellis | May 11, 1915 |
| 1,303,000 | Weinhardt | May 6, 1919 |
| 1,592,237 | Walker | July 13, 1926 |
| 1,911,874 | Barkeij | May 30, 1933 |
| 2,154,359 | Sarazin | Apr. 11, 1939 |
| 2,182,988 | Iseler | Dec. 12, 1939 |
| 2,426,875 | Hasbrouck et al. | Sept. 2, 1947 |

FOREIGN PATENTS

| Number | Country | Date |
|---|---|---|
| 25,391 | Great Britain | Nov. 10, 1906 |
| 381,018 | Great Britain | Sept. 29, 1932 |